United States Patent [19]

Morrison et al.

[11] Patent Number: 5,149,557
[45] Date of Patent: Sep. 22, 1992

[54] WHIPPABLE NON-DAIRY CREAMS

[75] Inventors: Anthony Morrison, Bedford; Ian M. Kimsey, Radwell; Heather Marks, Bedford, all of Great Britain

[73] Assignee: Van den Bergh Foods Co., Division of Conopco, Inc., Lisle, Ill.

[21] Appl. No.: 694,182

[22] Filed: May 1, 1991

[30] Foreign Application Priority Data

May 2, 1990 [EP] European Pat. Off. ........ 90304805.6

[51] Int. Cl.$^5$ ........................ A23L 1/09; A23L 13/00
[52] U.S. Cl. .................................. 426/570; 426/585; 426/613; 426/572; 426/602; 426/583
[58] Field of Search ............... 426/570, 572, 613, 583, 426/602, 585

[56] References Cited

U.S. PATENT DOCUMENTS

| | | | |
|---|---|---|---|
| 2,936,324 | 5/1960 | Hasek et al. | 252/79 |
| 3,944,680 | 3/1976 | van Pelt et al. | 426/570 |
| 4,107,343 | 8/1978 | Petricca | 426/570 |
| 4,310,561 | 1/1982 | Buddemeyer et al. | 426/613 |
| 4,396,638 | 8/1983 | Edo et al. | 426/564 |
| 4,547,385 | 10/1985 | Lindstam | 426/570 |
| 4,556,574 | 12/1985 | Andersson et al. | 426/570 |

FOREIGN PATENT DOCUMENTS

| | | |
|---|---|---|
| 0011345 | 5/1980 | European Pat. Off. ........... 426/570 |
| 95001 | 11/1983 | European Pat. Off. . |
| 294119 | 12/1988 | European Pat. Off. . |
| 1022089 | 3/1966 | United Kingdom . |
| 2080325 | 3/1982 | United Kingdom . |

OTHER PUBLICATIONS

Copending application: Jones et al.—Ser No. 07/814,251; filed Dec. 23, 1991.
Copending application: Jones et al.—Ser. No. 07/718,717; filed Jun. 21, 1991.
Copending application: Van Heteren et al.—Ser. No. 07/725,904; filed Oct. 28, 1991.
Copending application: Van Heteren et al.—Ser. No. 07/783,283; filed Jul. 3, 1991.
Copending application: Campbell et al.—Ser. No. 07/640,652; filed Jan. 14, 1991.

Primary Examiner—Jeanette Hunter
Attorney, Agent, or Firm—Ronald A. Koatz; A. Kate Huffman

[57] ABSTRACT

The invention concerns with whippable non-dairy creams with low fat levels (15-25 wt %), that possess excellent properties, like a whipping time less than 6 min. Also a production-process is described, which includes a tempering step to make the NDC whippable within 4 min.

17 Claims, No Drawings

WHIPPABLE NON-DAIRY CREAMS

So far whippable non-dairy creams are known, which comprise water continuous fat emulsions with an aqueous phase, containing optionally some butter milk component and thickener and a fat phase, which contains fat and an emulsifier system. In FR 2 185 018 e.g. NDC's are disclosed, that contain 25-50 wt% of fat. In order to make those NDC's whippable within an acceptable time it is essential that a globular protein is incorporated in the NDC, whereas it should not contain any coagulated protein. In that way an NDC can be obtained with a minimum fat content of 25 wt% that is whippable in about 3 min.

From US 4 107 343 NDC's are known that contain 20-30 wt% of fat. However, those NDC's are only whippable in 3-5 min, when they contain a buffer and quite a large amount (more than 0.75 wt%) of an emulsifier system. The emulsifier system consists of at least three components and is therefore very complicated.

Low fat levels make NDC's in general unwhippable with an ordinary domestic, electrical whipper (e.g. a Kenwood-Chef). This means, that in the general trend to achieve food products with a lower caloric value, whippable creams with a low fat content so far were difficult to make.

We have overcome this and therefore our invention concerns in the first place with a whippable, low fat non-dairy cream. This new whippable non-dairy cream (NDC) comprises a water continuous emulsion of an aqueous phase, containing optionally a butter milk component, preferably butter milk powder (BMP) and thickeners and a fat phase, comprising fat and an emulsifier system and which NDC contains 15-25 wt% fat, not more than 0.7 wt% of the emulsifier system and which NDC is whippable within 6 minutes, preferably within 4 minutes, when using a domestic, electrical whipper (e.g. the Kenwood-Chef).

Although EP 294 119 discloses NDC's with a fat content as low as 15 wt% it does not describe our NDC's. E.g. the fats that must be used according to this EP publication must display a particular N-profile. In the only example an NDC is described that has a fat content of 25 wt%, whereas whipping times are not mentioned. In fact, whipping times would be very long (more than 7 min) when applying the disclosures of EP 294 119 to the low fat NDC's of this same document.

Our NDC preferably contains 17-20 wt% fat, whereas the fat can be chosen from the group consisting of palmkernel, palm kernel stearin, hardened palmkernel, palm midfraction, palm stearin, coconut, hardened coconut, cocoa butter substitutes, butter fat and mixture thereof. We preferably use coconut fat in the fat composition for our NDC's. A preferred fat consists of a mixture of hardened palmkernel m.p. 38° C. and coconut. The two components of this last mixture preferably are present in weight ratios of 25:75-75:25. Although the fat phase can contain butter fat, we prefer to limit the amount of butter fat in the NDC to a maximum of 10 wt%, preferably less than 4 wt%. At least part of the fat can be replaced by well known fat replacers, e.g. polyol fatty acid polyesters. Examples of these polyesters are described in U.S. Pat. Nos. 3,600,186, 4,005,195 or EP Pat. Publ. Nos. 233,856, 236,288 and 235,836.

The best NDC's are obtained, when we incorporate 1-5 wt% of milk protein, in particular casein into our NDC's.

In the composition also an emulsifier system is present. This emulsifier system can consist of every kind of known emulsifier, but preferably polyglycerol esters, Lactodan (a Grindsted product), lecithines and/or monoglycerides are used. Those emulsifiers can be split up into two groups: 1. stabilising emulsifiers such as saturated polyglycerol esters or saturated monoglycerides and 2. destabilising emulsifiers, such as unsaturated polyglycerol esters, unsaturated monoglycerides and lecithins. It is preferred that our NDC's contain at least one component of each of those two groups of emulsifiers.

When a lecithin is used the amount of lecithin present is less than 0.35 wt%. When a saturated monoglyceride is used we prefer to use a saturated $C_{16}$ or $C_{18}$-fatty acid monoglyceride in an amount of less than 0.25 wt%. When an unsaturated emulsifier is used we prefer to use an unsaturated monoglyceride from a C18:1 fatty acid.

In order to improve the taste of an NDC it is well known to add some amount of butter milk component to the NDC. We therefore prefer NDC's, that contain up to 10 wt% butter milk powder (BMP).

The invention also comprises a method for the preparation of the whippable NDC according to the invention, mentioned above. In the art whippable NDC's are obtained by making an emulsion of an aqueous phase, containing BMP and thickeners and a fat phase, containing the emulsifier system. These two phases are mixed under high shear, preferably homogenised at about 60° C., after which an oil in water premix is obtained. This premix is treated with steam, according to a UHT-treatment (i.e. about 2.5 seconds with steam of about 150° C.), in order to sterilise or pasteurise the premix. Indirect heat treatment via a tubular heat exchanger is also possible.

The sterilised premix is homogenised in general in two stages, after which a sterilised, homogenised product with a temperature of about 60° C. is obtained. This product is cooled and stored at a temperature of 5°-10° C.

However, when we use this process for the production of low fat NDC's it is often difficult to obtain an NDC, that is whippable within 6 minutes. Often we obtain an NDC that is too stable and that requires very long whipping times, if whipping is possible at all.

We have found a new process, which makes those unwhippable low-fat NDC's whippable within 4 minutes. This new process includes a tempering step at the end of the normal NDC making process. Therefore our NDC manufacturing process comprises the making of an emulsion of a water phase, containing thickener and optionally butter milk component and a fat phase, containing fat and an emulsifier system, processing the so obtained emulsion by heating, sterilisation, homogenisation and cooling to a temperature below 15° C. and which process is characterized by a tempering step, which is carried out, after the cooling, by warming the emulsion to ambient temperature (20°-25° C.) and keeping it at this temperature for several hours, after which the NDC is cooled again to below 15° C.

The emulsion is heated before the sterilisation advantageously to a temperature of 55°-85° C. The sterilisation, which is proceeded after this heating is preferably carried out as a UHT-treatment by indirect heating via a tubular heat exchanger or preferably by injecting steam of high temperature (130°-150° C.) during a short time (less than 30 seconds, preferably 1-5 seconds). The homogenisation is carried out, while the emulsion is at a temperature above the melting point of the fat, preferably at 50°-85° C.

The cooling of the NDC after the homogenisation is normally proceeded to a temperature below 15° C., preferably below 10° C.

In the tempering step the emulsion normally is warmed to a temperature of 15°-25° C., at which temperature the NDC is kept for 18-30 hours.

EXAMPLE I

An emulsion was made of 82 wt% of an aqueous phase, containing 7 wt% butter milk powder, 0.25 wt% lecithin, 0.15 wt% saturated monoglyceride (Dimodan), 0.08 wt% guar gum and 0.04 wt% locust bean gum and 18 wt% of a fat phase, comprising 8 wt% palmkernel 38, 8 wt% coconut oil and 2 wt% butter fat. This emulsion was heated to 80° C. and treated with steam (145° C.) during 3 seconds. The emulsion so obtained was homogenised, using pressures of 100 and 30 bar in 2 stages after which a sterilised, homogenised product with a temperature of 80° C. was obtained. This product was cooled to 8° C. and stored at 5° C. for 1 week.

This product was warmed again to 20° C. and kept at this temperature for 24 hours and cooled again to 5° C. and stored for 1 week.

The NDC showed the following properties:

| whiptime | fresh cream (no tempering) 4 min. 10 sec | tempered cream 2 min. 55 sec |
| --- | --- | --- |
| Boucher (= firmness) | 60 | 75 |
| Overrun (%) | 212 | 205 |
| viscosity at 5° C. (mPa s at 100 cm$^{-1}$) | 52 | 75 |

EXAMPLE II

As in Example I, except that the following composition was used: 85 wt% aqueous phase; 7 wt% BMP; 0.25 wt% lecithin; 0.15 wt% Dimodan; 0.08 wt% guar gum; 0.04 wt% LBG and 15 wt% fat phase, comprising 7 wt% palmkernel 38, 7 wt% coconut oil and 1 wt% butter fat.

The same processing as in Example I was applied, except that a single stage homogenisation at a pressure of 100 bar was used. The product was cooled to 8° C. and stored at 5° C. for 1 week. The resulting product displayed the following performance:

| whiptime | untempered 8.0 min | tempered 5.0 min |
| --- | --- | --- |
| Boucher | 58 | 64 |
| Overrun | 203% | 200% |
| viscosity at 5° C. (m.Pa.s at 100 cm$^{-1}$) | 37 | 150 |

EXAMPLE III

As in Example II, except:
18 wt% fat phase, comprising 8% coconut oil, 8% palmkernel stearine and 2% butter fat. This resulted in a product with the following properties:

| whiptime | Untempered 4 min, 35 sec |
| --- | --- |
| Boucher | 58 |
| Overrun | 214% |
| Viscosity at 5° C. | 29 |

EXAMPLE IV

As in Example III, however a fat phase with 10% coconut oil and 8% palmkernel stearine was used. Result:

| whiptime | Untempered 3 min, 36 sec |
| --- | --- |
| Boucher | 62 |
| Overrun | 214% |
| Viscosity at 5° C. | 35 |

EXAMPLE V

As in Example III, however, a fatphase comprising 8 wt% palmkernel 38, 8 wt% palm mid fraction (Calvetta ®) and 2 wt% butterfat was used. Result:

| whiptime | Untempered 6 min |
| --- | --- |
| Boucher | 58 |
| Overrun | 214% |
| Viscosity at 5° C. | 30 |

We claim:

1. A whippable non-dairy cream comprising:
   a water-continuous emulsion of an aqueous phase having up to 10% of a buttermilk component and optionally having a thickener;
   a fat phase having a fat selected from the group consisting of palm kernel, hardened palm kernel, palm midfraction, palm stearin, palm kernel stearin, coconut, hardened coconut, cocoa butter substitutes, butter fat or mixtures thereof; and
   an emulsifier system having at least a stabilizing emulsifier and at least a destabilizing emulsifier,
   wherein the non-dairy cream has 15-25 wt.% of the fat and not more than 0.7 wt.% of the emulsifier system and the non-dairy cream is whippable within 6 minutes using a domestic electrical whipper.

2. Whippable non-dairy cream according to claim 1, which is whippable within 4 min.

3. Whippable non-dairy cream according to claim 1, wherein the non-dairy cream contains 17-20 wt% fat.

4. Whippable non-dairy cream, according to claim 1, wherein the fat contains coconut fat.

5. Whippable non-dairy cream according to claim 1, wherein the fat is a mixture of hardened palm kernel m.p. 38° C. and coconut oil.

6. Whippable non-dairy cream according to claim 5, wherein the fat is a mixture of hardened palm kernel m.p. 38° C. and coconut oil with a ratio of the components within 25/75 and 75/25.

7. Whippable non-dairy cream, according to claim 1, wherein the non-dairy cream contains less than 10 wt% butter fat.

8. Whippable non-dairy cream, according to claim 1, wherein the non-dairy cream contains 1-5 wt.% of milk protein.

9. Whippable non-dairy cream according to claim 1, wherein the stabilizing emulsifier is selected from the group of saturated polyglycerol esters or saturated monoglycerides and the destabilizing emulsifier is selected from the group of unsaturated polyglycerol esters, unsaturated monoglycerides or lecithins.

10. Whippable non-dairy cream according to claim 9, wherein less than 0.35 wt.% lecithin, and less than 0.25 wt.% saturated $C_{16}$ or $C_{18}$ monoglyceride, or less than 0.25 wt.% saturated $C_{16}$ or $C_{18}$ monoglyceride is present.

11. Whippable non-dairy cream according to claim 1, wherein the milk protein is casein.

12. Process for the preparation of a whippable non-dairy cream by making an emulsion of a water phase, containing optionally butter milk component and thickener and a fat phase, containing fat and an emulsifier system, processing the so obtained emulsion by heating, sterilisation, homogenisation and cooling to a temperature below 15° C., characterised by a tempering step, which is carried out after the cooling by warming the cooled emulsion to ambient temperature and keeping it at this temperature for several hours after which the non-dairy cream is cooled again below 15° C.

13. Process according to claim 12, wherein the emulsion is heated to 55°–85° C. before the sterilisation.

14. Process according to claim 12, wherein the sterilisation is carried out as a UHT-treatment by injecting steam of high temperature during a short time.

15. Process according to claim 12 wherein the homogenisation is carried out, while the emulsion is at a temperature of 50°–85° C.

16. Process according to claim 12, wherein the cooling after the homogenisation is proceeded to a temperature of maximum 10° C.

17. Process according to claim 12, wherein the emulsion is warmed to a temperature of 15°–25° C. and kept at this temperature for 18–30 hours.

* * * * *